United States Patent
Goto et al.

(10) Patent No.: US 11,618,965 B2
(45) Date of Patent: Apr. 4, 2023

(54) NI-PLATED STEEL SHEET AND METHOD FOR MANUFACTURING NI-PLATED STEEL SHEET

(71) Applicant: NIPPON STEEL CORPORATION, Tokyo (JP)

(72) Inventors: Yasuto Goto, Tokyo (JP); Kiyokazu Ishizuka, Tokyo (JP); Takehiro Takahashi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 6 days.

(21) Appl. No.: 17/296,395

(22) PCT Filed: Dec. 20, 2019

(86) PCT No.: PCT/JP2019/050102
§ 371 (c)(1),
(2) Date: May 24, 2021

(87) PCT Pub. No.: WO2020/137887
PCT Pub. Date: Jul. 2, 2020

(65) Prior Publication Data
US 2022/0033988 A1 Feb. 3, 2022

(30) Foreign Application Priority Data
Dec. 27, 2018 (JP) .............................. JP2018-245984

(51) Int. Cl.
*C22C 19/03* (2006.01)
*B32B 15/01* (2006.01)
(Continued)

(52) U.S. Cl.
CPC ............ *C25D 5/617* (2020.08); *B32B 15/015* (2013.01); *C21D 9/46* (2013.01); *C22C 19/03* (2013.01);
(Continued)

(58) Field of Classification Search
CPC .............................. B32B 15/015; C22C 19/03
(Continued)

(56) References Cited

U.S. PATENT DOCUMENTS 5,576,113 A * 11/1996 Hirofumi ............... B21D 22/21
428/684
5,840,441 A * 11/1998 Hirofumi .................. B21B 3/02
429/166
(Continued)

FOREIGN PATENT DOCUMENTS

EP 2 523 233 B1 9/2017
EP 2 770 079 B1 11/2017
(Continued)

*Primary Examiner* — Humera N. Sheikh
*Assistant Examiner* — Katherine A Christy
(74) *Attorney, Agent, or Firm* — Birch, Stewart, Kolasch & Birch, LLP

(57) ABSTRACT

A Ni-plated steel sheet according to an aspect of the present invention includes: a base steel sheet; an Fe—Ni diffusion alloy region disposed on the base steel sheet; and a Ni plating region disposed on the Fe—Ni diffusion alloy region, in which an average equivalent circle diameter of crystal grains made of Ni (fcc) in the Ni plating region measured in a cross section perpendicular to a rolled surface of the base steel sheet is 0.2 to 4.0 μm.

12 Claims, 3 Drawing Sheets

(51) Int. Cl.
- *C25D 5/00* (2006.01)
- *C25D 5/14* (2006.01)
- *C21D 9/46* (2006.01)
- *C22C 38/00* (2006.01)
- *C22C 38/02* (2006.01)
- *C22C 38/04* (2006.01)
- *C25D 3/12* (2006.01)
- *C25D 5/50* (2006.01)

(52) U.S. Cl.
CPC ............ *C22C 38/002* (2013.01); *C22C 38/02* (2013.01); *C22C 38/04* (2013.01); *C25D 3/12* (2013.01); *C25D 5/14* (2013.01); *C25D 5/50* (2013.01)

(58) Field of Classification Search
USPC .......................................................... 428/680
See application file for complete search history.

(56) References Cited

U.S. PATENT DOCUMENTS

| | | |
|---|---|---|
| 2012/0171518 A1 | 7/2012 | Takematsu et al. |
| 2012/0219825 A1 | 8/2012 | Minagi et al. |
| 2013/0209867 A1 | 8/2013 | Minagi et al. |
| 2015/0197857 A1 | 7/2015 | Nakada et al. |
| 2017/0170436 A1* | 6/2017 | Unno .................. C25D 7/0614 |
| 2018/0347061 A1 | 12/2018 | Sadaki et al. |
| 2018/0366691 A1 | 12/2018 | Sadaki et al. |

FOREIGN PATENT DOCUMENTS

| | | |
|---|---|---|
| JP | 6-2104 A | 1/1994 |
| JP | 6-346284 A | 12/1994 |
| WO | WO 2010/143374 A1 | 12/2010 |
| WO | WO 2011/024443 A1 | 3/2011 |
| WO | WO 2011/083562 A1 | 7/2011 |
| WO | WO 2017/094919 A1 | 6/2017 |
| WO | WO 2017/094921 A1 | 6/2017 |

* cited by examiner

US 11,618,965 B2

NI-PLATED STEEL SHEET AND METHOD FOR MANUFACTURING NI-PLATED STEEL SHEET

TECHNICAL FIELD OF THE INVENTION

The present invention relates to a Ni-plated steel sheet and a method for manufacturing a Ni-plated steel sheet.

Priority is claimed on Japanese Patent Application No. 2018-245984, filed Dec. 27, 2018, the content of which is incorporated herein by reference.

RELATED ART

Ni-plated steel sheets have high chemical stability and are therefore suitable as materials for battery cans. However, considering the application to xEV (a general term for EVs, hybrid vehicles, and plug-in hybrid vehicles), Ni-plated steel sheets are required to have high chemical stability over a longer period of time.

In recent years, there has been an increasing demand for a reduction in size, an increase in capacity, and long-term durability of batteries. Therefore, workability and long-term durability required for steel sheets for batteries has also increased. However, there is a reciprocal relationship between workability and chemical stability (specifically, Ni elution resistance). Generally, by refining the crystal grains constituting Ni plating, the Ni plating is less likely to crack and the workability can be improved. However, when the crystal grains are refined, the amount (area) of the grain boundaries that are the origin of Ni elution increases, so that the Ni elution resistance is impaired.

For example, the following steel sheets have been proposed as steel sheets for batteries.

Patent Document 1 provides a surface-treated steel sheet for a battery container including a steel sheet, an iron-nickel diffusion layer formed on the steel sheet, and a nickel layer formed on the iron-nickel diffusion layer to form the outermost layer, in which, when an Fe intensity and a Ni intensity are continuously measured from the surface of the surface-treated steel sheet for a battery container in a depth direction by a radio-frequency glow discharge optical emission spectroscopic analyzer, the thickness of the iron-nickel diffusion layer, which is the difference (D2−D1) between a depth (D1) at which the Fe intensity shows a first predetermined value and a depth (D2) at which the Ni intensity shows a second predetermined value, is 0.04 to 0.31 µm, the total amount of nickel contained in the iron-nickel diffusion layer and the nickel layer is 4.4 g/m² or more and less than 10.8 g/m².

Patent Document 2 discloses a Ni-plated steel sheet having excellent press formability, including a Fe—Ni diffusion layer and a softened Ni layer thereon on a surface corresponding to the outer surface of a battery can, and further including a semi-gloss Ni plating layer thereon, in which the Ni coating weight of the Fe—Ni diffusion layer and the softened Ni layer thereon is smaller than the coating weight of the semi-gloss Ni plating layer, the average roughness Ra of the semi-gloss Ni layer measured with a stylus type roughness meter is 1.0 µm or more and 2.0 µm or less, and the maximum height Ry is 5 µm or more and 20 µm or less. Similarly, in Patent Document 2, the Ni coating weight of the Fe—Ni diffusion layer and the softened Ni layer thereon is 5 to 8 g/m², and the coating weight of the semi-gloss Ni plating layer is 8 g/m² or more. Furthermore, a Ni-plated steel sheet having excellent press formability including a semi-gloss plating layer in which the surface roughness Ra' in 2.5 µm×2.5 µm, which is obtained for the surface of the semi-gloss Ni plating layer by an atomic force microscope, is between 5 and 22 nm is disclosed.

Patent Document 3 discloses a Ni-plated steel sheet for a battery can having excellent pressability, including a Fe—Ni diffusion layer and a Ni layer thereon on a surface corresponding to the outer surface of a battery can, and further including a semi-gloss Ni plating layer thereon, in which the Ni coating weight of the Fe—Ni diffusion layer and the Ni layer thereon is equal to or smaller than the coating weight of the semi-gloss Ni plating layer, the coating weight of the semi-gloss Ni plating layer is 2.25 g/m² or more, the surface roughness Ra1 in a range of 2.5 µm×2.5 which is obtained for the surface of the semi-gloss Ni plating layer by an atomic force microscope, is between 3 and 11 nm, and regarding the surface roughness Ra of the semi-gloss Ni plating layer, a surface roughness Ra2 obtained by a stylus type roughness meter is 0.3 µm or more and 2.0 µm or less.

Patent Document 4 discloses a method for manufacturing a Ni-plated steel sheet, including: a step of Ni plating on the surface of a steel sheet with Ni in a plating amount of 0.3 to 2 µm, a step of heating the Ni-plated steel sheet to 600° C. to 800° C. to form an Fe—Ni diffusion layer on an outermost layer, and a step of performing temper rolling on the steel sheet so that the Fe—Ni diffusion layer has a roughness Ra of 0.9 to 2.0 µm and a roughness Ry of 4.0 to 15 µm. Furthermore, Patent Document 4 discloses drawing of a Ni-plated steel sheet in which an Fe—Ni diffusion layer is provided as the outermost layer, the roughness Ra of the diffusion layer is 0.9 to 2.0 µm, the roughness Ry is 4.0 to 15 µm, and as the proportions of Fe and Ni of the diffusion layer, the proportion of Fe is 20% to 50% when analyzed by an Auger, into a battery can using an aqueous solution containing a water-soluble emulsion as a press lubricant.

Patent Document 5 discloses a nickel-plated steel strip having high corrosion resistance in which a nickel plating layer is formed on one surface or both surfaces of a cold-rolled steel sheet, a part or the entirety of the nickel plating layer forms a nickel-iron diffusion layer, and moreover, the proportion of iron exposed to the outermost surface of the nickel plating layer is 30% or less.

However, even with the above techniques, it has been difficult to provide a Ni-plated steel sheet having formability required for a steel sheet for a battery and having excellent Ni elution resistance.

PRIOR ART DOCUMENT

Patent Document

[Patent Document 1] PCT International Publication No. WO2017/094919
[Patent Document 2] PCT International Publication No. WO2011/024443
[Patent Document 3] PCT International Publication No. WO2011/083562
[Patent Document 4] PCT International Publication No. WO2010/143374
[Patent Document 5] Japanese Unexamined Patent Application, First Publication No. H6-2104

DISCLOSURE OF THE INVENTION

Problems to be Solved by the Invention

An object of the present invention is to provide a Ni-plated steel sheet having formability required for a steel sheet for a battery and having excellent Ni elution resistance, and a method for manufacturing the same.

Means for Solving the Problem

The gist of the present invention is as follows.

(1) A Ni-plated steel sheet according to an aspect of the present invention includes: a base steel sheet; an Fe—Ni diffusion alloy region disposed on the base steel sheet; and a Ni plating region disposed on the Fe—Ni diffusion alloy region, in which an average equivalent circle diameter of crystal grains made of Ni (fcc) in the Ni plating region measured in a cross section perpendicular to a rolled surface of the base steel sheet is 0.2 to 4.0 µm.

(2) In the Ni-plated steel sheet according to (1), a value obtained by dividing the average equivalent circle diameter of the crystal grains made of the Ni (fcc) in the Ni plating region by a thickness of the Ni plating region may be 0.50 to 2.00.

(3) In the Ni-plated steel sheet according to (1) or (2), a Ni coating weight per one surface in the Fe—Ni diffusion alloy region and the Ni plating region may be 1.5 to 65 g/m².

(4) A method for manufacturing a Ni-plated steel sheet according to another aspect of the present invention is a method for manufacturing the Ni-plated steel sheet according to any one of (1) to (3), the method including: electrolytic Ni plating on a base steel sheet to obtain a Ni-plated steel sheet material; and annealing the Ni-plated steel sheet material, in which the electrolytic Ni plating includes three or more on-times and off-times between the on-times, an average current density per one surface of the base steel sheet in each of the on-times is set to 200 A/m² to 3,500 A/m², an amount of charge per one surface of the base steel sheet in each of the on-times is set to 800 C/m² to 40,000 C/m², in each of the on-times, a current density is set to be inconstant, and a maximum current density per one surface of the base steel sheet is set to be higher than the average current density per one surface of the base steel sheet by 7% or more and is set to 4,000 A/m² or less, a soaking temperature in the annealing is set to 650° C. or higher and 850° C. or lower, and a soaking time in the annealing is set to 10 seconds or longer and 109 seconds or shorter.

(5) In the method for manufacturing the Ni-plated steel sheet according to (4), a length of each of the off-times may be 0.1 seconds or longer.

Effects of the Invention

According to the present invention, it is possible to provide a Ni-plated steel sheet having formability required for a steel sheet for a battery and having excellent Ni elution resistance, and a method for manufacturing the same.

BRIEF DESCRIPTION OF THE DRAWINGS

FIG. 1-2 is an example of the energization pattern of the electrolytic Ni plating in the method for manufacturing a Ni-plated steel sheet according to the present embodiment.

FIG. 1-3 is an example of the energization pattern of the electrolytic Ni plating in the method for manufacturing a Ni-plated steel sheet according to the present embodiment.

FIG. 2 is a schematic view of the Ni-plated steel sheet according to the present embodiment.

FIG. 3 is an example of an EBSP image of a Ni plating region of the Ni-plated steel sheet according to the present embodiment.

EMBODIMENTS OF THE INVENTION

The present inventors examined the actions and effects of various manufacturing conditions in order to enhance Ni elution resistance without impairing the formability of a Ni-plated steel sheet. As a result, it was found that by making the energization pattern in an electrolytic Ni plating satisfy the requirements described below, it is possible to dramatically improve the Ni elution resistance without impairing the formability of the Ni-plated steel sheet.

Figure 1:
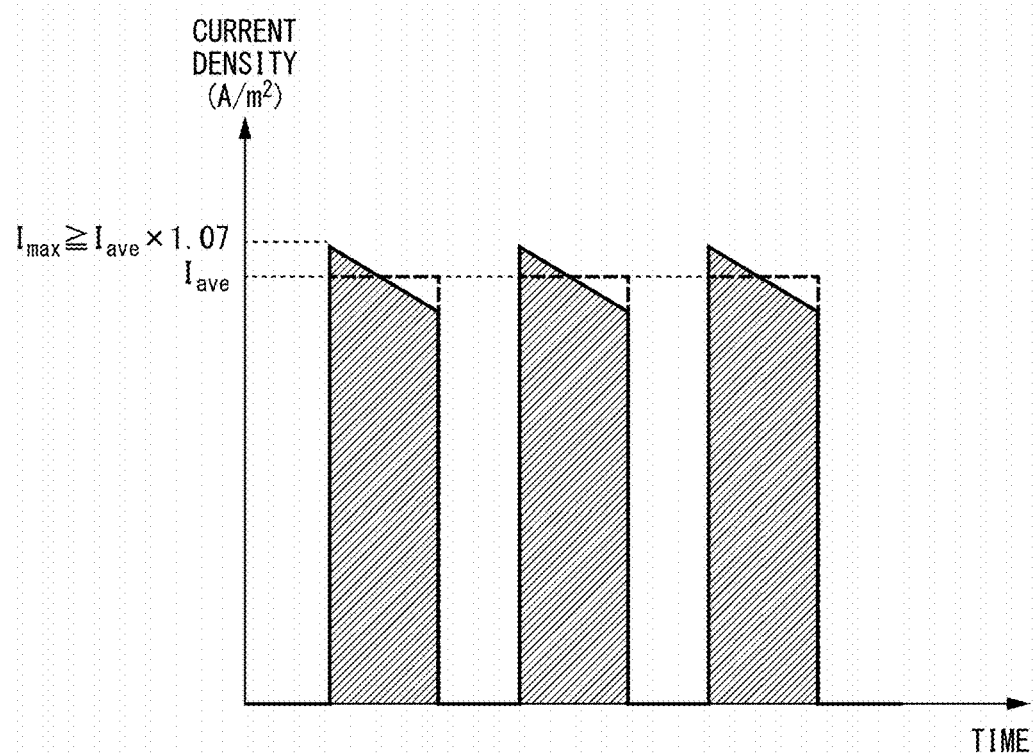
FIG. 1-1 is an example of an energization pattern of an electrolytic Ni plating in a method for manufacturing a Ni-plated steel sheet according to the present embodiment.

FIG. 1-1 is a schematic view showing an example of the energization pattern in the electrolytic Ni plating found by the present inventors, where the vertical axis represents the current density and the horizontal axis represents time. This energization pattern satisfies the following requirements. Setting the current density to be inconstant means that the current density does not become a constant value during an energization period (on-time), as shown in FIG. 1-1 and the like.

(1) Three or more on-times and rest periods (off-times) between the on-times are included.

(2) The average current density $I_{ave}$ in each of the on-times is set to 200 to 3,500 A/m².

(3) The amount of charge in each of the on-times is set to 800 to 40,000 C/m².

(4) The current density in each of the on-times is set to be inconstant, and the maximum current density $I_{max}$ is set to be larger than the average current density $I_{ave}$ in the on-time by 7% or more.

The Ni-plated steel sheet obtained through the electrolytic Ni plating having the energization pattern satisfying the above requirements and an annealing exhibited extremely high Ni elution resistance while satisfying the formability required for a steel sheet for a battery. In order to examine the reason why the Ni-plated steel sheet has both high formability and high Ni elution resistance, the structure of a Ni plating region thereof was analyzed. The average equivalent circle diameter of the crystal grains in the Ni plating region observed in a cross section perpendicular to the rolled surface of a base steel sheet 11 (hereinafter, sometimes simply referred to as "cross section") was in a range of 0.2 to 4.0 µm. This indicates that coarsening of crystal grains is suppressed to the extent that the propagation of cracks can be suppressed, and the amount (area) of grain boundaries that serve as a corrosion path for Ni elution inside the Ni plating region is reduced.

The evaluation of the grain size of the crystal grains in the Ni plating region is usually performed on the surface of the plating (that is, the surface parallel to the rolled surface of the base steel sheet). However, in order to evaluate the number of grain boundaries contained in the Ni plating region, grain size measured in the cross section of the Ni plating region (that is, the cross section perpendicular to the rolled surface of the base steel sheet) is required. Furthermore, as a result of investigation by the present inventors, there was no correlation between the average equivalent circle diameter of the crystal grains measured on the surface of the Ni plating region and the average equivalent circle diameter of the crystal grains measured in the cross section of the Ni plating region. Since the crystals constituting the Ni plating region of the Ni-plated steel sheet are not equiaxial grains, the average equivalent circle diameter of Ni (fcc) grains measured on the surface of the Ni plating region does not always coincide with that measured in the cross section of the Ni plating region. Therefore, it was considered inappropriate to use the average equivalent circle diameter of the crystal grains measured on the surface of the Ni plating region as an alternative index of the grain size measured in the cross section of the Ni plating region. Therefore, the present inventors decided to control the average equivalent circle diameter of the crystal grains measured in the cross section of the Ni plating region.

The reason why the above-mentioned energization pattern imparts such a plating structure to the Ni plating region is not clear. At present, the present inventors predict the presence of the following mechanisms. In the electrolytic Ni plating according to the above-mentioned energization pattern, electrodeposition stress changes periodically. It is considered that the Ni plating thus obtained has a periodic change in internal stress in a depth direction. It is presumed that this change in internal stress has some effect on the Ni plating region during annealing.

Figures 1, 2:
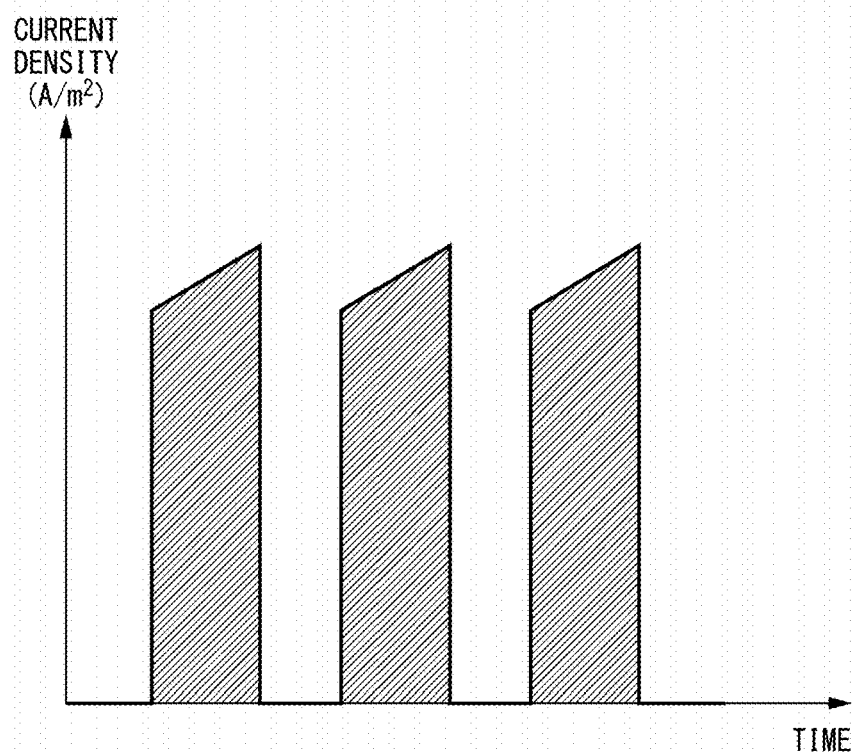

As shown in FIG. 2, a Ni-plated steel sheet 1 according to the present embodiment obtained by the above findings includes the base steel sheet 11, an Fe—Ni diffusion alloy region 12 disposed on the base steel sheet 11, and a Ni plating region 13 disposed on the Fe—Ni diffusion alloy region, in which the average equivalent circle diameter of Ni (fcc) grains in the Ni plating region measured in a cross section perpendicular to a rolled surface of the base steel sheet 11 is 0.2 to 4.0 µm. The Fe—Ni diffusion alloy region 12 and the Ni plating region 13 may be disposed on only one surface or both surfaces of the base steel sheet 11. Hereinafter, the Ni-plated steel sheet 1 according to the present embodiment will be described in detail.

(Base Steel Sheet 11)

The base steel sheet 11 is a steel sheet that serves as a substrate for the Ni-plated steel sheet 1. The composition, sheet thickness, metallographic structure, and the like of the base steel sheet 11 are not particularly limited. In a case where the base steel sheet 11 is used as the material of a battery container, for example, the base steel sheet 11 may be made of low carbon aluminum-killed steel, interstitial free steel (IF steel or ultra low carbon steel), or the like. In the case where the base steel sheet 11 is used as the material of a battery container, the thickness of the base steel sheet 11 may be set to, for example, 0.15 to 0.8 mm.

(Fe—Ni Diffusion Alloy Region 12)

The Fe—Ni diffusion alloy region 12 is a region obtained by interdiffusion between Ni plating and the base steel sheet 11. The Fe—Ni diffusion alloy region 12 may be defined as a layer which contains 5 mass % or more of Fe and of which 90 mass % or more of the remainder is Ni. The Fe—Ni diffusion alloy region may further contain elements other than Fe and Ni (for example, Co) as long as the above requirements are satisfied. It is also permissible for the Fe—Ni diffusion alloy region to contain impurities.

The thickness of the Fe—Ni diffusion alloy region 12 is not particularly limited and can be appropriately selected within a normal range. From the viewpoint of securing the coating adhesion and corrosion resistance of the Ni-plated steel sheet 1, the thickness of the Fe—Ni diffusion alloy region is preferably 0.2 µm or more. On the other hand, from the viewpoint of securing the iron elution resistance of the Ni-plated steel sheet 1, the thickness of the Fe—Ni diffusion alloy region is preferably 1 µm or less.

(Ni Plating Region 13)

The Ni plating region 13 is a region of Ni plating in which interdiffusion with the base steel sheet 11 did not occur. The Ni plating region 13 may be defined as a layer which contains less than 5 mass % of Fe and of which 90 mass % or more of the remainder is Ni. In order to improve the mechanical properties of the Ni plating region 13, the Ni plating region 13 may further contain elements such as Co. The Ni plating region becomes a soft recrystallized Ni layer by annealing. The soft Ni plating region follows the deformation of the steel sheet during mechanical processing such as press forming and prevents the base steel sheet 11 from being exposed. Therefore, the Ni plating region 13 can further improve the workability of the Ni-plated steel sheet 1.

In the Ni-plated steel sheet 1 according to the present embodiment, the equivalent circle diameter of the crystal grains constituting the Ni plating region 13 is within a predetermined range. Specifically, the average equivalent circle diameter of the crystal grains made of Ni (fcc) constituting the Ni plating region 13 (hereinafter, referred to as "Ni (fcc) grains") measured in a cross section perpendicular to the rolled surface of the base steel sheet 11 is in a range of 0.2 to 4.0 µm. Ni (fcc) is a crystal which contains less than 5 mass % of Fe, of which 90 mass % or more of the remainder is Ni, and which has an fcc structure (lattice constant a=3.524 Å). It should be noted that in the present embodiment, the average equivalent circle diameter of the Ni (fcc) grains is a value measured in the cross section. Since the crystals constituting the Ni plating region of the Ni-plated steel sheet are not equiaxial grains, the average equivalent circle diameter of the Ni (fcc) grains measured on the surface of the Ni plating region does not always coincide with that measured in the cross section of the Ni plating region. The Ni-plated steel sheet 1 according to the present embodiment is characterized in that the grain boundary amount inside the Ni plating region is controlled, not the grain boundary amount on the surface of the Ni plating region. Therefore, the grain size of the Ni (fcc) grains in the Ni-plated steel sheet 1 according to the present embodiment has to be evaluated in the cross section. Hereinafter, unless otherwise specified, the average equivalent circle diameter means the average equivalent circle diameter measured in the cross section.

According to the experimental results of the present inventors, by causing the average equivalent circle diameter of the Ni (fcc) grains constituting the Ni plating region 13 to be 0.2 to 4.0 µm, the Ni elution resistance can be dramatically improved without impairing the formability of the Ni-plated steel sheet 1. On the other hand, when the average equivalent circle diameter of the Ni (fcc) grains is less than 0.2 µm, the Ni elution resistance of the Ni-plated steel sheet is insufficient. When the average equivalent circle diameter of the Ni (fcc) grains is less than 0.2 µm, it is assumed that electrodeposit becomes powdery and the workability deteriorates. On the other hand, when the average equivalent circle diameter of the Ni (fcc) grains exceeds 4.0 µm, wrinkles are likely to occur in the Ni plating region during drawing, ironing, or the like, and the workability of the Ni-plated steel sheet is impaired. Therefore, the average equivalent circle diameter of the Ni (fcc) grains is specified to be 0.2 to 4.0 µm. The lower limit of the average equivalent circle diameter of the Ni (fcc) grains may be set to 0.4 µm, 0.8 µm, 1.0 µm, or 1.5 µm. The upper limit of the average equivalent circle diameter of the Ni (fcc) grains may be set to 3.5 µm, 3.2 µm, 3.0 µm, or 2.5 µm.

The Ni plating region 13 is not particularly limited as long as the above requirements are satisfied, but the Ni plating region 13 may further have the following features depending on the application of the Ni-plated steel sheet 1.

In the Ni-plated steel sheet 1 according to the present embodiment, it is preferable that a value obtained by dividing the average equivalent circle diameter of the Ni (fcc) grains in the Ni plating region 13 by the thickness of the Ni plating region 13 (hereinafter sometimes abbreviated to "grain size-thickness ratio") be 0.50 to 2.00. In a case where the Ni (fcc) grains in the Ni plating region 13 have a shape stretched along the surface of the base steel sheet 11, the equivalent circle diameter thereof may exceed the thickness of the Ni plating region 13. Therefore, there are cases where the grain size-thickness ratio exceeds 1.0.

By setting the grain size-thickness ratio to 0.50 or more, the Ni elution resistance of the Ni-plated steel sheet can be further enhanced. In addition, by setting the grain size-thickness ratio to 2.00 or less, the workability of the Ni-plated steel sheet 1 can be more stably secured. For the above reasons, the grain size-thickness ratio is preferably set to 0.50 to 2.00. The grain size-thickness ratio is more preferably set to 0.70 or more, 0.90 or more, or 1.20 or more. The grain size-thickness ratio is more preferably set to 1.80 or less, 1.60 or less, or 1.50 or less.

The film thickness of the Ni plating region 13 is not particularly limited, but from the viewpoint of securing the workability of the Ni-plated steel sheet 1, the thickness of the Ni plating region is preferably 0.8 μm or more. The thickness of the Ni plating region may be set to 1.0 μm or more, 1.5 μm or more, or 2.0 μm or more. Furthermore, the effect of improving the workability by the Ni plating region is considered to be saturated when the thickness of the Ni plating region exceeds about 6.8 μm. Therefore, from the viewpoint of economy, the thickness of the Ni plating region is preferably 6.8 μm or less. The thickness of the Ni plating region may be set to 4.0 μm or less, 3.0 μm or less, or 2.0 μm or less.

The Ni coating weight per one surface of the Fe—Ni diffusion alloy region 12 and the Ni plating region 13 may be specified to be within a range of 1.5 to 65 g/m$^2$. By setting the Ni coating weight to 1.5 g/m$^2$ or more, the corrosion resistance and iron elution resistance of the Ni-plated steel sheet 1 can be reliably secured, which is preferable. By setting the Ni coating weight to 65 g/m$^2$ or less, the manufacturing cost of the Ni-plated steel sheet 1 can be reduced, which is preferable. The Ni coating weight per one surface may be set to 2.4 g/m$^2$ or more, 4.8 g/m$^2$ or more, or 8 g/m$^2$ or more. The Ni coating weight per one surface of the Ni-plated steel sheet 1 may be set to 32 g/m$^2$ or less, 24 g/m$^2$ or less, or 12 g/m$^2$ or less.

(Measurement Method)

A method for measuring the average equivalent circle diameter of the Ni (fcc) grains in the Ni plating region 13 measured in the cross section perpendicular to the rolled surface of the base steel sheet 11 is as follows. First, the Ni-plated steel sheet 1 is embedded in a resin and cut perpendicularly to the rolled surface of the base steel sheet 11. Next, the cut section is mirror-polished. As necessary, a cut section may be prepared using a focused ion beam device (FIB). By performing electron backscatter pattern analysis (EBSP) on the cut section, a Ni (fcc) image can be photographed. By performing image processing on the Ni (fcc) image, the average area of Ni (fcc) grains in the EBSP image can be calculated based on the area of each of the Ni (fcc) grains in the EBSP image and the area ratio of each of the Ni (fcc) grains in the image. From the average area, the average equivalent circle diameter of the Ni (fcc) grains can be calculated. The average equivalent circle diameter of the Ni (fcc) grains is calculated by performing image processing on an observed visual field area of 300 μm$^2$ (10 μm×30 μm) or more including the Ni plating region.

Figures 1, 2, 3:
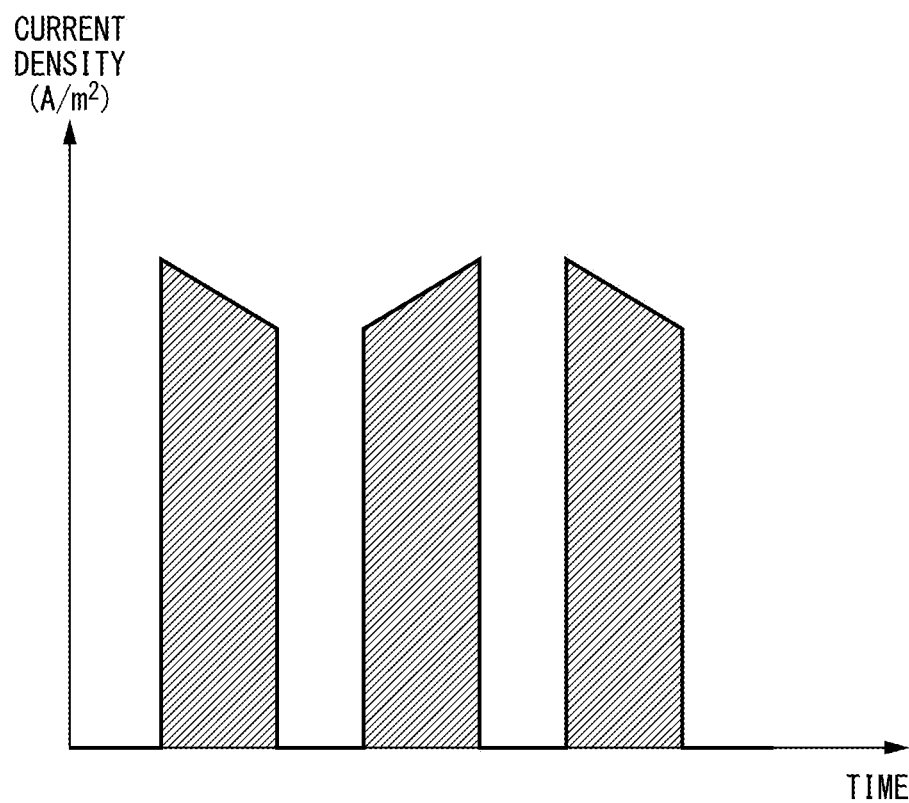
Figure 2:
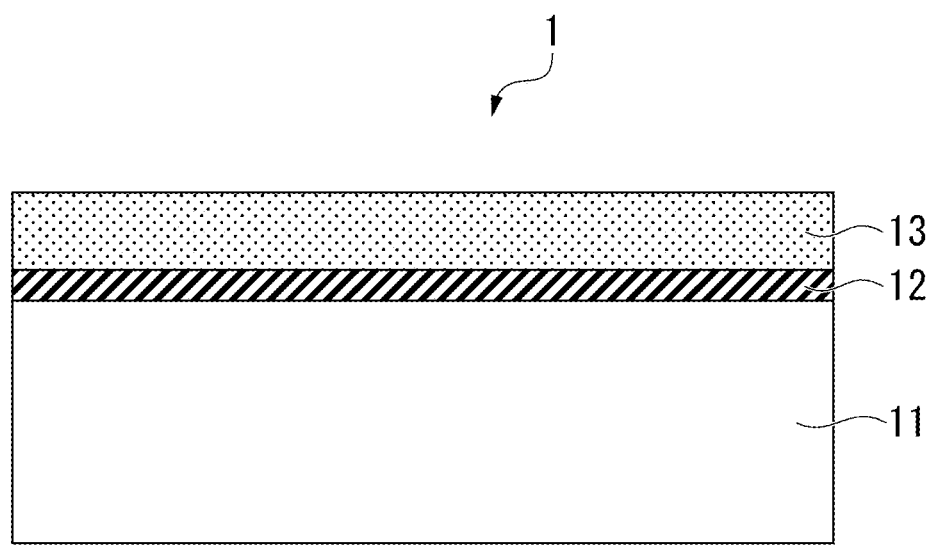
Figure 3:

FIG. 3 shows an example of a Ni (fcc) image obtained by using EBSP. The photograph of FIG. 3 is a grayscale image, but in an actual EBSP image, the orientations of crystal grains are displayed by color. A point where a crystal orientation difference of 5° or more is formed is determined to be a grain boundary, and a region surrounded by the grain boundary is determined to be a Ni (fcc) crystal grain. However, in a case where the average equivalent circle diameter of Ni (fcc) grains is less than 0.05 μm, the Ni (fcc) grains are treated as noise and ignored.

The thickness of the Ni plating region 13 can be measured by analyzing element concentrations in the depth direction using EPMA or the like. By polishing the cut section perpendicular to the rolled surface of the base steel sheet 11 of the Ni-plated steel sheet 1 and continuously analyzing the composition from the surface of the Ni-plated steel sheet 1 toward the base steel sheet 11, a region in which the Fe content is 5% or more and 90% or more of the remainder is Ni (that is, the Fe—Ni diffusion alloy region 12), a region in which the Fe content is less than 5% and 90% or more of the remainder is Ni (that is, the Ni plating region 13), and the other region (that is, the base steel sheet 11) can be identified. Based on the identification result, the interface of each of the base steel sheet 11, the Fe—Ni diffusion alloy region 12, and the Ni plating region 13 can be specified. By measuring the distance between the interfaces, the thicknesses of the Fe—Ni diffusion alloy region 12 and the Ni plating region 13 can be measured. In consideration of variation, it is desirable to perform the above measurement at five points and regard the average value of the measured values at each point as the thickness of the Fe—Ni diffusion alloy region 12 and the Ni plating region 13.

The Ni coating weight can be measured by, for example, an ICP analysis method. First, the Fe—Ni diffusion alloy region 12 and the Ni plating region 13 having a predetermined area are dissolved with an acid. Next, the total amount of Ni contained in the solution is quantitatively analyzed by ICP. By dividing the total amount of Ni quantified by ICP by the above-mentioned predetermined area, the Ni coating weight per unit area can be obtained.

(Manufacturing Method)

Next, a preferred method for manufacturing the Ni-plated steel sheet 1 according to the present embodiment will be described. However, a Ni-plated steel sheet satisfying the above requirements is considered to be the Ni-plated steel sheet 1 according to the present embodiment regardless of the manufacturing method.

The method for manufacturing the Ni-plated steel sheet 1 according to the present embodiment includeselectrolytic Ni plating on the base steel sheet 11 to obtain a Ni-plated steel sheet material, andannealing the Ni-plated steel sheet material. Here, the electrolytic Ni plating includes three or more on-times and off-times between the on-times, an average current density per one surface of the base steel sheet in each of the on-times is set to 200 A/m$^2$ to 3,500 A/m$^2$, an amount of charge per one surface of the base steel sheet in each of the on-times is set to 800 C/m$^2$ to 40,000 C/m$^2$, and in each of the on-times, a current density is set to be inconstant and a maximum current density per one surface of the base steel sheet is higher than the average current density per one surface of the base steel sheet by 7% or more. Furthermore, a soaking temperature in the annealing is set to 650° C. or higher and 850° C. or lower, and a soaking time in the annealing is set to 10 seconds or longer and 109 seconds or shorter.

(Electrolytic Ni Plating)

In the method for manufacturing the Ni-plated steel sheet 1 according to the present embodiment, first, by performing electrolytic Ni plating on the base steel sheet 11, a steel sheet material (Ni-plated steel sheet material) having Ni plating that is not alloyed is produced, in which an energization pattern has to satisfy the following requirements:

(1) Three or more on-times and off-times between the on-times are included.

(2) The average current density $I_{ave}$ in each of the on-times is set to 200 to 3,500 A/m$^2$.

(3) The amount of charge in each of the on-times is set to 800 to 40,000 C/m$^2$.

(4) The maximum current density $I_{max}$ in each of the on-times is set to be larger than the average current density $I_{ave}$ in each of the on-times by 7% or more.

The energization pattern includes three or more on-times and off-times between the on-times. The on-time means a period during which a current flows through the base steel sheet 11, and the off-time means a period during which the energization of the base steel sheet 11 is substantially suspended. Ideally, the current value during the off-time has to be zero. However, due to the capabilities of a power supply and a plating apparatus, there are cases where it takes some time to completely reduce the current value to zero even if the energization is suspended. Therefore, a period during which the current flowing through the base steel sheet 11 is small (for example, a period during which the current density is less than 5% of $I_{ave}$) can also be regarded as the off-time. In a case where it is difficult to completely reduce the current density to zero due to the restrictions on a manufacturing facility, the off-time may be regarded as the period during which the current density is less than 5% of $I_{ave}$, and the on-time may be regarded as the another period. In a case where $I_{ave}$ in each of the on-times is different, a period during which the current density is less than 5% of the smallest $I_{ave}$ may be regarded as the off-time.

According to the experimental results of the present inventors, in a case where the number of on-times is two or less, the Ni-plated steel sheet 1 according to the present embodiment cannot be obtained. It is considered that this is because the Ni plating before annealing cannot be given a periodic change in internal stress in the depth direction.

The average current density $I_{ave}$ in each of the on-times is set to 200 to 3,500 A/m$^2$, and the amount of charge in each of the on-times is 800 to 40,000 C/m$^2$. The maximum current density $I_{max}$ in each of the on-times is set to be larger than the average current density $I_{ave}$ in the on-time by 7% or more. The average current density $I_{ave}$ is a value obtained by dividing a value obtained by integrating a graph of current density and time in the on-time according to the above definition (corresponding to the area of the hatched portion in FIGS. 1-1 to 1-3) by the length of the on-time. The amount of charge is an amount of charge during the on-time according to the above definition. The maximum current density $I_{max}$ is the maximum value of the current density in each of the on-times.

In a case where the average current density $I_{ave}$ is insufficient, the amount of charge is insufficient, or the maximum current density $I_{max}$ is insufficient, the Ni-plated steel sheet 1 according to the present embodiment cannot be obtained. It is presumed that this is because the change in internal stress given to the Ni plating before annealing becomes small. On the other hand, in a case where the average current density $I_{ave}$, the amount of charge, or the maximum current density $I_{max}$ is excessive (for example, in a case where $I_{max}$ exceeds 4,000 A/m$^2$), plating surface burns and the like occur, and the Ni plating cannot be suitably formed.

An example of the energization pattern is shown in FIG. 1-1. Here, energization in which the current density at the start of the on-time is set to the maximum current density $I_{max}$ and the current density is gradually decreased is repeated. On the other hand, as shown in FIG. 1-2, energization in which the current density at the start of the on-time is set to the minimum current density, the current density is gradually increased, and the current density at the end of the on-time is set to the maximum current density $I_{max}$ may be repeated. Alternatively, as shown in FIG. 1-3, energization in which the current density is gradually decreased and energization in which the current density is gradually increased may be alternately performed. Although not shown, partway through the on-time, energization in which the current density is set to the maximum current density $I_{max}$ may be performed. In all of FIGS. 1-1 to 1 to 3, the average current density, the maximum current density, and the amount of electricity are the same during each of the on-times, but such values may be different for each of the on-times as long as the above-mentioned requirements are satisfied.

In the off-time, the current density may be set to zero or a value sufficiently lower than the maximum current density $I_{ave}$ (for example, less than 5% of $I_{ave}$). The length of the off-time is not particularly limited, but may be specified as 0.1 seconds or longer and 10 seconds or shorter in consideration of the capacity of the power supply and the like.

(Annealing)

In the method for manufacturing the Ni-plated steel sheet 1 according to the present embodiment, a part of the Ni plating is subsequently alloyed by annealing the Ni-plated steel sheet material. The soaking temperature in the annealing is set to 650° C. or higher and 850° C. or lower, and the soaking time in the annealing is set to 10 seconds or longer and 109 seconds or shorter. The soaking time means a time for maintaining the isothermal temperature after the temperature of the Ni-plated steel sheet material reaches the soaking temperature of 650° C. or higher and 850° C. or lower.

In a case where the soaking temperature or the soaking time is insufficient, alloying becomes insufficient and recrystallization in the Ni plating region 13 also becomes insufficient. As a result, the Ni-plated steel sheet 1 according to the present embodiment cannot be obtained. On the other hand, in a case where the soaking temperature or the soaking time becomes excessive, there is a concern that the Ni plating region 13 may disappear due to the alloying of all the Ni plating.

EXAMPLES

The effects of one aspect of the present invention will be described more specifically by way of examples. However, the conditions in the examples are one example of conditions adopted to confirm the feasibility and effects of the present invention. The present invention is not limited to this one example of conditions. The present invention can adopt various conditions as long as the object of the present invention is achieved without departing from the gist of the present invention.

Various Ni-plated steel sheets were manufactured under the conditions described below.

The base steel sheet was Al—K steel (C: 0.057 mass %, Si: 0.004 mass %, Mn: 0.29 mass %, P: 0.014 mass %, S:

0.007 mass %, and the remainder being iron and impurities). The sheet thickness was 0.3 mm in each case.

The base steel sheet 11 was subjected to electrolytic Ni plating in a Watt bath (plating bath composition: nickel sulfate hexahydrate 240 g/L, nickel chloride hexahydrate 30 g/L, and boric acid 30 g/L, pH: 3.5, and bath temperature: 45° C.) under the conditions shown in Table 1, and was further annealed under the conditions shown in Table 1.

the atmospheric gas in a furnace and confirming that the sheet temperature became 300° C. or lower, the resultant was discharged from the furnace.

Various Ni-plated steel sheets obtained by the above-mentioned methods were evaluated by the following methods. The evaluation results are shown in Table 4.

(1) Measurement of Average Equivalent Circle Diameter of Ni (fcc) Grains (Ni (fcc) Equivalent Circle Diameter) in

TABLE 1

| | No. | Number of times of energization | $I_{ave}$ (A/m²) | Total amount of charge (C/m²) | Energization amount in each of energization periods (C/m²) | $I_{max}$ (A/m²) | Soaking temperature (° C.) | Soaking time (second) |
|---|---|---|---|---|---|---|---|---|
| Examples | A1 | 3 | 1000 | 90000 | 30000 | 1100 | 750 | 35 |
| | A2 | 4 | 1000 | 90000 | 22500 | 1100 | 750 | 35 |
| | A3 | 6 | 1000 | 90000 | 15000 | 1100 | 750 | 35 |
| | A4 | 8 | 1000 | 90000 | 11250 | 1100 | 750 | 35 |
| | A5 | 10 | 1000 | 90000 | 9000 | 1100 | 750 | 35 |
| | A6 | 12 | 1000 | 90000 | 7500 | 1100 | 750 | 35 |
| | A7 | 6 | 200 | 60000 | 10000 | 220 | 750 | 35 |
| | A8 | 6 | 500 | 60000 | 10000 | 550 | 750 | 35 |
| | A9 | 6 | 1500 | 60000 | 10000 | 1650 | 750 | 35 |
| | A10 | 6 | 2000 | 60000 | 10000 | 2200 | 750 | 35 |
| | A11 | 6 | 2500 | 60000 | 10000 | 2750 | 750 | 35 |
| | A12 | 6 | 3000 | 60000 | 10000 | 3300 | 750 | 35 |
| | A13 | 6 | 3500 | 60000 | 10000 | 3850 | 750 | 35 |
| | A14 | 6 | 1000 | 60000 | 10000 | 1070 | 750 | 35 |
| | A15 | 6 | 1000 | 60000 | 10000 | 1080 | 750 | 35 |
| | A16 | 6 | 1000 | 60000 | 10000 | 1150 | 750 | 35 |
| | A17 | 6 | 1000 | 60000 | 10000 | 1200 | 750 | 35 |
| | A18 | 6 | 1000 | 60000 | 10000 | 1300 | 750 | 35 |
| | A19 | 6 | 1000 | 60000 | 10000 | 1500 | 750 | 35 |
| | A20 | 6 | 3200 | 100000 | 16667 | 3520 | 750 | 35 |
| | A21 | 6 | 3200 | 100000 | 16667 | 3840 | 750 | 35 |
| | A22 | 6 | 1000 | 30000 | 5000 | 1100 | 650 | 35 |
| | A23 | 6 | 1000 | 30000 | 5000 | 1100 | 720 | 35 |
| | A24 | 6 | 1000 | 30000 | 5000 | 1100 | 780 | 35 |
| | A25 | 6 | 1000 | 30000 | 5000 | 1100 | 830 | 35 |
| | A26 | 6 | 1000 | 30000 | 5000 | 1100 | 720 | 10 |
| | A27 | 6 | 1000 | 30000 | 5000 | 1100 | 720 | 25 |
| | A28 | 6 | 1000 | 30000 | 5000 | 1100 | 720 | 50 |
| | A29 | 6 | 1000 | 30000 | 5000 | 1100 | 720 | 75 |
| | A30 | 6 | 1000 | 30000 | 5000 | 1100 | 720 | 90 |
| | A31 | 6 | 1000 | 30000 | 5000 | 1100 | 720 | 105 |
| | A32 | 6 | 1000 | 5000 | 833 | 1100 | 750 | 35 |
| | A33 | 6 | 1000 | 8000 | 1333 | 1100 | 750 | 35 |
| | A34 | 6 | 1000 | 16000 | 2667 | 1100 | 750 | 35 |
| | A35 | 6 | 1000 | 30000 | 5000 | 1100 | 750 | 35 |
| | A36 | 6 | 1000 | 45000 | 7500 | 1100 | 750 | 35 |
| | A37 | 6 | 1000 | 90000 | 15000 | 1100 | 750 | 35 |
| | A38 | 6 | 1000 | 120000 | 20000 | 1100 | 750 | 35 |
| | A39 | 6 | 1000 | 225000 | 37500 | 1100 | 750 | 35 |
| Comparative examples | B1 | 2 | 1000 | 90000 | 45000 | 1100 | 750 | 35 |
| | B2 | 6 | 150 | 60000 | 10000 | 165 | 750 | 35 |
| | B3 | 6 | 4000 | 60000 | 10000 | 4400 | 750 | 35 |
| | B4 | 6 | 1000 | 4000 | 667 | 1100 | 750 | 35 |
| | B5 | 6 | 1000 | 250000 | 41667 | 1100 | 750 | 35 |
| | B6 | 6 | 1000 | 60000 | 10000 | 1030 | 750 | 35 |
| | B7 | 6 | 3200 | 100000 | 16667 | 4160 | 750 | 35 |
| | B8 | 6 | 1000 | 30000 | 5000 | 1100 | 630 | 35 |
| | B9 | 6 | 1000 | 30000 | 5000 | 1100 | 860 | 35 |
| | B10 | 6 | 1000 | 30000 | 5000 | 1100 | 750 | 8 |
| | B11 | 6 | 1000 | 30000 | 5000 | 1100 | 750 | 115 |

Other conditions not shown in Table 1 are as follows. The shape of a current pattern was as shown in FIG. 1-3. That is, the current density was gradually decreased in the odd number of times of energization, and the current density was gradually increased in the even number of times of energization. $I_{ave}$, amount of charge, and $I_{max}$ were set to common values for each of the on-times. The length of the off-time was set to 0.1 seconds. An annealing atmosphere was set to $N_2$-2% $H_2$. After cooling from the soaking temperature with Ni Plating Region Measured in Cross Section Perpendicular to Rolled Surface of Base Steel Sheet First, the Ni-plated steel sheet 1 was embedded in a resin and cut perpendicularly to the rolled surface of the base steel sheet 11. Next, the cut section was mirror-polished. By performing electron backscatter pattern analysis (EBSP) on the cut section, a Ni (fcc) image was photographed. By performing image processing on the Ni (fcc) image, the average area of Ni (fcc) grains in the EBSP image was calculated based on the area of each of the Ni (fcc) grains in the EBSP image and the area ratio of each of the Ni (fcc) grains in the image. From the average area, the average equivalent circle diameter of the Ni (fcc) grains was calculated. The observed visual field area at this time was set to 300 μm$^2$ (10 μm×30 μm).

For reference, for samples that passed a characteristic evaluation, the average equivalent circle diameter of the Ni (fcc) grains in the Ni plating region was also measured on the surface of the Ni plating region. The measurement method was as follows. First, the Ni-plated steel sheet 1 was washed with acetone. Next, the surface of the Ni plating region was subjected to ion milling (ion milling apparatus ArBlade 5000 manufactured by Hitachi High-Tech Corporation, gas used: Ar, accelerating voltage: 4 kV, and sputtering time: 4 minutes). EBSP was performed on the surface obtained in this manner in the same procedure as in the cross section evaluation, and the average equivalent circle diameter of the Ni (fcc) grains was calculated.

(2) Measurement of Thicknesses of Fe—Ni Diffusion Alloy Region 12 and Ni Plating Region 13

The thicknesses of the Fe—Ni diffusion alloy region 12 and the Ni plating region 13 were measured by analyzing element concentrations in the depth direction using EPMA. By polishing the cut section perpendicular to the rolled surface of the base steel sheet 11 of the Ni-plated steel sheet 1 and continuously analyzing the composition from the surface of the Ni-plated steel sheet 1 toward the base steel sheet 11, a region in which the Fe content was 5% or more and 90% or more of the remainder was Ni (that is, the Fe—Ni diffusion alloy region 12), a region in which the Fe content was less than 5% and 90% or more of the remainder was Ni (that is, the Ni plating region 13), and the other region (that is, the base steel sheet 11) were identified. Based on the identification result, the interface of each of the base steel sheet 11, the Fe—Ni diffusion alloy region 12, and the Ni plating region 13 was specified. By measuring the distance between the interfaces, the thicknesses of the Fe—Ni diffusion alloy region 12 and the Ni plating region 13 were measured. In consideration of variation, the above measurement was performed at five points, and the average value of the measured values at each point was regarded as the thickness of the Fe—Ni diffusion alloy region 12 and the Ni plating region 13.

(3) Measurement of Value (Grain Size-Thickness Ratio) Obtained by Dividing Average Equivalent Circle Diameter of Ni (fcc) Grains in Ni Plating Region by Thickness of Ni Plating Region The grain size-thickness ratio was obtained by dividing the average equivalent circle diameter obtained in the procedure (1) above by the thickness of the Ni plating region 13 obtained in the procedure (2) above.

(4) Measurement of Ni Coating Weight

The Ni coating weight in the Ni-plated steel sheet 1 was measured by an ICP analysis method. First, the Fe—Ni diffusion alloy region 12 and the Ni plating region 13 having an area of 2,500 mm$^2$ (50 mm square) were dissolved with an acid. Next, the total amount of Ni contained in the solution was quantitatively analyzed by ICP. By dividing the total amount of Ni quantified by ICP by the area of the above-mentioned measurement target region, the Ni coating weight per unit area was obtained.

(5) Evaluation of Workability

A 4-stage transfer press was used for processing. The final shape of a test piece was a cylindrical can with a diameter of 18 mm and a height of 50 mm. A 10 mm square region centered on a portion having a height of 25 mm was cut out, and the secondary electron image on the can inner surface side thereof was photographed in three visual fields at a magnification of 200-fold using SEM. The number of Ni-based coating peels and cracks in an area of 100 μm$^2$ or more was measured. A case where the total number of peels and cracks observed was ten or more per 1 mm$^2$ was indicated as "B (Bad)" in the table. A case where the total number of peels and cracks was one to nine or less per 1 mm$^2$ was indicated as "G (Good)" in the table, and a case of zero was indicated as "VG (Very Good)" in the table. In addition, those with wrinkles that were visible at the time of pressing were also indicated as "B (Bad)" in the table.

(6) Evaluation of Ni Elution Resistance 10 mL of a 35% KOH solution was sealed in the can inner surface of the cylindrical can prepared in the evaluation of workability, a platinum wire was installed as a counter electrode in the center of the inner surface of the cylindrical can, the potential of the cylindrical can was maintained at 0.3 V vs. Hg/HgO using a Hg/HgO reference electrode, and a constant potential corrosion test was conducted at 60° C. for 1,000 hours. The KOH solution after the test was analyzed by ICP-MS, and Ni and Fe eluted in the solution were quantified. As the evaluation criteria, first, a case where 0.1 mg/L or more of Fe was detected was indicated as "B (Bad)" regardless of the amount of Ni eluted. In addition, either a case where Fe was not detected (less than 0.1 mg/L) and a case where more than 5 mg/L of Ni was detected was also indicated as "B (Bad)" in the table. A case where Fe was not detected (less than 0.1 mg/L) and 1 to 5 mg/L of Ni was detected was indicated as "G (Good)", a case where Fe was not detected (less than 0.1 mg/L) and 0.1 to 1 mg/L of Ni was detected was indicated as "VG (Very Good)", and a case where Fe was not detected (less than 0.1 mg/L), and less than 0.1 mg/L of Ni was detected was indicated as "GG (Greatly Good)" in the table.

TABLE 2

| No. | Average equivalent circle diameter of Ni (fcc) (μm) | Grain size-thickness ratio | Thickness of Fe—Ni diffusion alloy region (μm) | Thickness of Ni plating region (μm) | Ni adhesion amount (g/m$^2$) | (Reference) Ni grain size measured from surface (μm) |
|---|---|---|---|---|---|---|
| A1 | 3.6 | 1.71 | 0.4 | 2.1 | 27 | 14 |
| A2 | 2.4 | 1.14 | 0.4 | 2.1 | 27 | 7.1 |
| A3 | 1.5 | 0.71 | 0.4 | 2.1 | 27 | 3.2 |
| A4 | 1.3 | 0.62 | 0.4 | 2.1 | 27 | 2.1 |
| A5 | 1.2 | 0.57 | 0.4 | 2.1 | 27 | 1.4 |
| A6 | 1.2 | 0.57 | 0.4 | 2.1 | 27 | 1.2 |
| A7 | 2.6 | 1.86 | 0.4 | 1.4 | 18 | 18 |
| A8 | 1.8 | 1.29 | 0.4 | 1.4 | 18 | 5 |
| A9 | 0.8 | 0.57 | 0.4 | 1.4 | 18 | 0.75 |

TABLE 2-continued

| No. | Average equivalent circle diameter of Ni (fcc) (μm) | Grain size-thickness ratio | Thickness of Fe—Ni diffusion alloy region (μm) | Thickness of Ni plating region (μm) | Ni adhesion amount (g/m²) | (Reference) Ni grain size measured from surface (μm) |
|---|---|---|---|---|---|---|
| A10 | 0.8 | 0.57 | 0.4 | 1.4 | 18 | 0.55 |
| A11 | 0.7 | 0.50 | 0.4 | 1.4 | 18 | 0.41 |
| A12 | 0.6 | 0.50 | 0.4 | 1.2 | 16 | 0.28 |
| A13 | 0.4 | 0.50 | 0.4 | 0.8 | 14 | 0.17 |
| A14 | 0.8 | 0.57 | 0.4 | 1.4 | 18 | 2.4 |
| A15 | 0.65 | 0.46 | 0.4 | 1.4 | 18 | 2.3 |
| A16 | 0.45 | 0.32 | 0.4 | 1.4 | 18 | 1.5 |
| A17 | 0.4 | 0.29 | 0.4 | 1.4 | 18 | 1.3 |
| A18 | 0.36 | 0.26 | 0.4 | 1.4 | 18 | 1.1 |
| A19 | 0.33 | 0.28 | 0.4 | 1.2 | 16 | 0.8 |
| A20 | 3.1 | 0.97 | 0.4 | 3.2 | 29 | 3.4 |
| A21 | 2.6 | 0.84 | 0.4 | 3.1 | 28 | 2.6 |
| A22 | 0.46 | 0.51 | 0.2 | 0.9 | 9 | 1.8 |
| A23 | 0.53 | 0.66 | 0.3 | 0.8 | 9 | 1.8 |
| A24 | 0.9 | 1.38 | 0.5 | 0.65 | 9 | 2.9 |
| A25 | 1.25 | 1.92 | 0.6 | 0.65 | 9 | 3.8 |
| A26 | 0.45 | 0.53 | 0.2 | 0.85 | 9 | 1.6 |
| A27 | 0.5 | 0.63 | 0.3 | 0.8 | 9 | 0.72 |
| A28 | 0.6 | 0.86 | 0.5 | 0.7 | 9 | 0.43 |
| A29 | 0.7 | 1.17 | 0.7 | 0.6 | 9 | 0.34 |
| A30 | 0.9 | 1.43 | 0.8 | 0.63 | 9 | 0.36 |
| A31 | 1 | 1.92 | 1 | 0.52 | 9 | 3 |
| A32 | 0.2 | 2.00 | 0.2 | 0.1 | 1.5 | 0.01 |
| A33 | 0.3 | 1.50 | 0.2 | 0.2 | 2.4 | 0.023 |
| A34 | 0.3 | 1.50 | 0.4 | 0.2 | 4.5 | 0.023 |
| A35 | 0.5 | 0.83 | 0.4 | 0.6 | 8 | 0.064 |
| A36 | 0.8 | 0.73 | 0.4 | 1.1 | 12 | 0.16 |
| A37 | 2.5 | 0.96 | 0.4 | 2.6 | 24 | 1.6 |
| A38 | 3.1 | 0.86 | 0.4 | 3.6 | 32 | 2.5 |
| A39 | 3.9 | 0.56 | 0.4 | 7 | 63 | 3.9 |
| B1 | 4.2 | 2.10 | 0.4 | 2 | 27 | |
| B2 | 4.4 | 3.14 | 0.4 | 1.4 | 18 | |
| B3 | 0.18 | 0.26 | 0.4 | 0.7 | 12 | |
| B4 | — | — | 0.4 | 0 | 1.2 | |
| B5 | 4.2 | 0.49 | 0.1 | 8.5 | 72 | |
| B6 | 4.1 | 2.93 | 0.4 | 1.4 | 18 | |
| B7 | 1.3 | 0.45 | 0.4 | 2.9 | 27 | |
| B8 | 0.17 | 0.18 | 0.1 | 0.95 | 9 | |
| B9 | 0.18 | 0.90 | 1.1 | 0.2 | 9 | |
| B10 | 0.17 | 0.19 | 0.15 | 0.9 | 9 | |
| B11 | 0.19 | 0.63 | 1.3 | 0.3 | 9 | |

TABLE 3

| No. | Workability | Ni elution resistance |
|---|---|---|
| A1 | G | VG |
| A2 | VG | GG |
| A3 | VG | GG |
| A4 | VG | GG |
| A5 | VG | GG |
| A6 | G | VG |
| A7 | VG | G |
| A8 | VG | VG |
| A9 | VG | GG |
| A10 | VG | GG |
| A11 | VG | GG |
| A12 | VG | GG |
| A13 | VG | VG |
| A14 | VG | GG |
| A15 | VG | GG |
| A16 | VG | GG |
| A17 | VG | GG |
| A18 | VG | VG |
| A19 | VG | VG |
| A20 | VG | GG |
| A21 | VG | VG |
| A22 | G | G |
| A23 | VG | VG |
| A24 | VG | VG |
| A25 | VG | VG |
| A26 | G | VG |
| A27 | VG | VG |
| A28 | VG | VG |
| A29 | VG | VG |
| A30 | VG | VG |
| A31 | VG | VG |
| A32 | G | G |
| A33 | VG | G |
| A34 | VG | G |
| A35 | VG | VG |
| A36 | VG | VG |
| A37 | VG | GG |
| A38 | VG | GG |
| A39 | G | GG |
| B1 | B | G |
| B2 | B | G |
| B3 | B | B |
| B4 | G | B |
| B5 | B | VG |
| B6 | B | G |
| B7 | B | B |
| B8 | B | B |
| B9 | B | B |

TABLE 3-continued

| No. | Workability | Ni elution resistance |
|-----|-------------|----------------------|
| B10 | B | B |
| B11 | G | B |

As shown in Table 2, in all of the examples, the average equivalent circle diameter of the Ni (fcc) grains in the Ni plating region measured in the cross section perpendicular to the rolled surface of the base steel sheet was 0.2 to 4.0 µm. In addition, these examples were excellent in both workability and Ni elution resistance.

Furthermore, in these examples, there was no particular correlation between the average equivalent circle diameter of the Ni (fcc) grains measured in the cross section and the average equivalent circle diameter of the Ni (fcc) grains measured from the surface. Therefore, it is considered that the average equivalent circle diameter of the Ni (fcc) grains measured in the cross section cannot be estimated based on the average equivalent circle diameter of the Ni (fcc) grains measured from the surface.

On the other hand, in Comparative Examples B1 to B6, the average equivalent circle diameter of the Ni (fcc) grains was outside the range of the present invention. In these comparative examples, one or both of workability and Ni elution resistance were inferior to those of the examples.

Comparative example B1 is an example in which the number of times of energization was only two. In Comparative Example B1, Ni (fcc grains) was more than 4.0 µm, and the workability was inferior.

Comparative example B2 is an example in which $I_{ave}$ was insufficient. In Comparative Example B2, Ni (fcc grains) was more than 4.0 µm, and the workability was inferior.

Comparative example B3 is an example in which $I_{ave}$ was exceeded. In Comparative Example B3, Ni (fcc grains) was less than 0.2 µm, and the workability and Ni elution resistance were inferior.

Comparative example B4 is an example in which the amount of charge was insufficient. In Comparative Example B4, no Ni region had remained and Ni (fcc grains) could not be measured. In terms of performance, Ni and Fe elution resistance was inferior.

Comparative example B5 is an example in which the amount of charge was exceeded. In Comparative Example B5, Ni (fcc grains) was more than 4.0 µm, and the workability was inferior.

Comparative Example B6 is an example in which $I_{max}$ was insufficient. In Comparative Example B6, $I_{max}$ was 103% of $I_{ave}$, Ni (fcc grains) was more than 4.0 µm, and the workability was inferior.

Comparative Example B7 is an example in which $I_{max}$ was exceeded. In Comparative Example B7, since $I_{max}$ exceeded 4,000 A/m², the appearance had plating burns, and the workability and Ni elution resistance were inferior.

Comparative Examples B8 to 11 are examples in which the annealing conditions were inappropriate. In Comparative Examples B8 to 11, Ni (fcc grains) was less than 0.2 µm, and both workability and Ni elution resistance, or workability were inferior.

INDUSTRIAL APPLICABILITY

According to the present invention, it is possible to provide a Ni-plated steel sheet having formability required for a steel sheet for a battery and having excellent Ni elution resistance, and a method for manufacturing the same. Such a Ni-plated steel sheet is suitable as a steel sheet for a battery and thus has extremely high industrial applicability.

BRIEF DESCRIPTION OF THE REFERENCE SYMBOLS

1 Ni-plated steel sheet
11 Base steel sheet
12 Fe—Ni diffusion alloy region
13 Ni plating region

The invention claimed is:

1. A Ni-plated steel sheet, comprising:
a base steel sheet;
an Fe—Ni diffusion alloy region disposed on the base steel sheet; and
a Ni plating region disposed on the Fe—Ni diffusion alloy region,
wherein an average equivalent circle diameter of crystal grains made of face-centered cubic (fcc) Ni in the Ni plating region measured in a cross section perpendicular to a rolled surface of the base steel sheet is 0.2 to 4.0 µm.

2. The Ni-plated steel sheet according to claim 1,
wherein a value obtained by dividing the average equivalent circle diameter of the crystal grains made of the Ni (fcc) in the Ni plating region by a thickness of the Ni plating region is 0.50 to 2.00.

3. The Ni-plated steel sheet according to claim 1,
wherein a total amount of Ni contained in the Fe—Ni diffusion alloy region and the Ni plating region, per unit area, is 1.5 to 65 g/m².

4. A method for manufacturing the Ni-plated steel sheet according to claim 1, the method comprising:
electrolytic Ni plating on a base steel sheet to obtain a Ni-plated steel sheet material; and
annealing the Ni-plated steel sheet material,
wherein the electrolytic Ni plating includes three or more on-times and off-times between the on-times,
an average current density per one surface of the base steel sheet in each of the on-times is set to 200 A/m² to 3,500 A/m²,
an amount of charge per one surface of the base steel sheet in each of the on-times is set to 800 C/m² to 40,000 C/m²,
in each of the on-times, a current density is set to be inconstant, and a maximum current density per one surface of the base steel sheet is set to be higher than the average current density per one surface of the base steel sheet by 7% or more and is set to 4,000 A/m² or less,
a soaking temperature in the annealing is set to 650° C. or higher and 850° C. or lower, and
a soaking time in the annealing is set to 10 seconds or longer and 109 seconds or shorter.

5. The method for manufacturing the Ni-plated steel sheet according to claim 4,
wherein a length of each of the off-times is 0.1 seconds or longer.

6. The Ni-plated steel sheet according to claim 2,
wherein a total amount of Ni contained in the Fe-Ni diffusion alloy region and the Ni plating region, per unit area, is 1.5 to 65 g/m².

7. A method for manufacturing the Ni-plated steel sheet according to claim 2, the method comprising:
electrolytic Ni plating on a base steel sheet to obtain a Ni-plated steel sheet material; and
annealing the Ni-plated steel sheet material, wherein the electrolytic Ni plating includes three or more on-times and off-times between the on-times, an average current density per one surface of the base steel sheet in each of the on-times is set to 200 A/m² to 3,500 A/m², an amount of charge per one surface of the base steel sheet in each of the on-times is set to 800 C/m² to 40,000 C/m², in each of the on-times, a current density is set to be inconstant, and a maximum current density per one surface of the base steel sheet is set to be higher than the average current density per one surface of the base steel sheet by 7% or more and is set to 4,000 A/m² or less, a soaking temperature in the annealing is set to 650° C. or higher and 850° C. or lower, and a soaking time in the annealing is set to 10 seconds or longer and 109 seconds or shorter.

8. A method for manufacturing the Ni-plated steel sheet according to claim 3, the method comprising:

electrolytic Ni plating on a base steel sheet to obtain a Ni-plated steel sheet material; and annealing the Ni-plated steel sheet material, wherein the electrolytic Ni plating includes three or more on-times and off-times between the on-times, an average current density per one surface of the base steel sheet in each of the on-times is set to 200 A/m² to 3,500 A/m², an amount of charge per one surface of the base steel sheet in each of the on-times is set to 800 C/m² to 40,000 C/m², in each of the on-times, a current density is set to be inconstant, and a maximum current density per one surface of the base steel sheet is set to be higher than the average current density per one surface of the base steel sheet by 7% or more and is set to 4,000 A/m² or less, a soaking temperature in the annealing is set to 650° C. or higher and 850° C. or lower, and a soaking time in the annealing is set to 10 seconds or longer and 109 seconds or shorter.

9. A method for manufacturing the Ni-plated steel sheet according to claim 6, the method comprising:

electrolytic Ni plating on a base steel sheet to obtain a Ni-plated steel sheet material; and annealing the Ni-plated steel sheet material, wherein the electrolytic Ni plating includes three or more on-times and off-times between the on-times, an average current density per one surface of the base steel sheet in each of the on-times is set to 200 A/m² to 3,500 A/m², an amount of charge per one surface of the base steel sheet in each of the on-times is set to 800 C/m² to 40,000 C/m², in each of the on-times, a current density is set to be inconstant, and a maximum current density per one surface of the base steel sheet is set to be higher than the average current density per one surface of the base steel sheet by 7% or more and is set to 4,000 A/m² or less, a soaking temperature in the annealing is set to 650° C. or higher and 850° C. or lower, and a soaking time in the annealing is set to 10 seconds or longer and 109 seconds or shorter.

10. The method for manufacturing the Ni-plated steel sheet according to claim 7, wherein a length of each of the off-times is 0.1 seconds or longer.

11. The method for manufacturing the Ni-plated steel sheet according to claim 8, wherein a length of each of the off-times is 0.1 seconds or longer.

12. The method for manufacturing the Ni-plated steel sheet according to claim 9, wherein a length of each of the off-times is 0.1 seconds or longer.

* * * * *